UNITED STATES PATENT OFFICE.

STEPHEN J. LANCASTER, OF PETROLIA, ONTARIO, CANADA.

LINIMENT.

SPECIFICATION forming part of Letters Patent No. 428,344, dated May 20, 1890.

Application filed December 14, 1889. Serial No. 333,779. (No specimens.) Patented in Canada July 29, 1885, No. 22,142.

*To all whom it may concern:*

Be it known that I, STEPHEN J. LANCASTER, of Petrolia, in the county of Lambton, Province of Ontario, and Dominion of Canada, have invented a new and Improved Liniment for the Treatment of Sciatica and other Diseases, (which was patented in Canada July 29, 1885, No. 22,142,) of which the following is a full, clear, and exact description.

This invention consists of a new and useful composition of matter to be used as a liniment for the treatment of sciatica, neuralgia, gout, inflammatory rheumatism, and other diseases of similar origin and nature.

My composition is made up of the following ingredients, combined in about the proportions stated—viz: alcohol, one gallon; capsicum, one pound; Prince's pine, (pipsissewa,) one pound; camphor-gum, one-half pound; oil of origanum, four ounces; oil of winter-green, one ounce.

My mode of preparing and mixing the above-named composition is as follows: Thus for each gallon of sixty-five, or thereabout, overproof alcohol, I take one pound of the best quality of capsicum, one pound of dried Prince's pine, otherwise known as pipsissewa, one-half pound of camphor-gum, four ounces oil of origanum, and one ounce of oil of winter-green, and mix the whole as follows: I first put the capisicum and Prince's pine into the alcohol and allow the same to remain therein for about forty-eight hours, (more or less,) then filter, and to the liquid thus obtained I add the other above-named ingredients of the composition, and as soon as the gum and oils are fully dissolved and combined with said liquid the whole is bottled up tightly, ready for use.

To use the liniment the same is applied externally to the soles of the feet of the patient and to the part or parts affected by friction or rubbing for such length of time as may be necessary, or until relief is obtained.

Having thus described my invention, what I claim as new, and desire to secure by Letters Patent, is—

The herein-described composition of matter to be used as a liniment for the treatment of sciatica and other diseases, the same being a tincture in alcohol of capsicum, Prince's pine, otherwise known as pipsissewa, and camphor-gum, with the oils of origanum and winter-green, substantially in the proportions specified.

STEPHEN J. LANCASTER.

Witnesses:
  GEO. MONCRIEF,
  THOS. J. ANDERSON.